United States Patent [19]

Noffsinger

[11] Patent Number: 5,105,891

[45] Date of Patent: Apr. 21, 1992

[54] CUSHIONED HORSESHOE

[76] Inventor: Alfred A. Noffsinger, 84-189 Indio Blvd., Indio, Calif. 92201

[21] Appl. No.: 625,156

[22] Filed: Dec. 10, 1990

[51] Int. Cl.⁵ .............................. A01L 7/02
[52] U.S. Cl. .......................... 168/13; 168/4
[58] Field of Search ............. 168/4, 12, 13, 23

[56] References Cited

U.S. PATENT DOCUMENTS

| | | | |
|---|---|---|---|
| 627,085 | 6/1899 | Allen | 168/13 |
| 779,757 | 1/1905 | Bartley | 168/13 |
| 924,790 | 6/1909 | Kane | 168/13 |
| 2,043,359 | 6/1936 | Swanstrom | 168/13 |
| 2,103,718 | 12/1937 | Goodwin | 168/12 |
| 2,157,826 | 5/1939 | Kearney | 168/13 |
| 4,585,068 | 4/1986 | Jurgensen | 168/13 X |
| 4,889,188 | 12/1989 | Anderson | 168/13 |

FOREIGN PATENT DOCUMENTS 4365  3/1889  United Kingdom ............ 168/13

*Primary Examiner*—John G. Weiss
*Assistant Examiner*—Nicholas D. Lucchesi
*Attorney, Agent, or Firm*—Francis X. LoJacono

[57] ABSTRACT

The invention defines a non-slip, shock-absorbing, cushioned horseshoe that substantially absorbs the shock encountered by a horse's hooves and legs when the horse is running or jumping. The cushioned horseshoe is defined by a base or mounting plate which is adapted with a plurality of boss members having locking holes, and a ground-engaging sole or body member that includes openings which are aligned with the locking holes of the mounting plate so as to receive and lock nails that are driven therein. The sole member consists of a wear-resistant, resilient material that is fixedly secured to the mounting plate for direct engagement with the ground surface. The resilient material is molded to the lower surface of the mounting plate and is received in a V-shaped channel having securing holes disposed therein, whereby the resilient material becomes fixedly secured to the lower mounting surface of the mounting plate during the molding process to prevent separation therefrom.

6 Claims, 1 Drawing Sheet

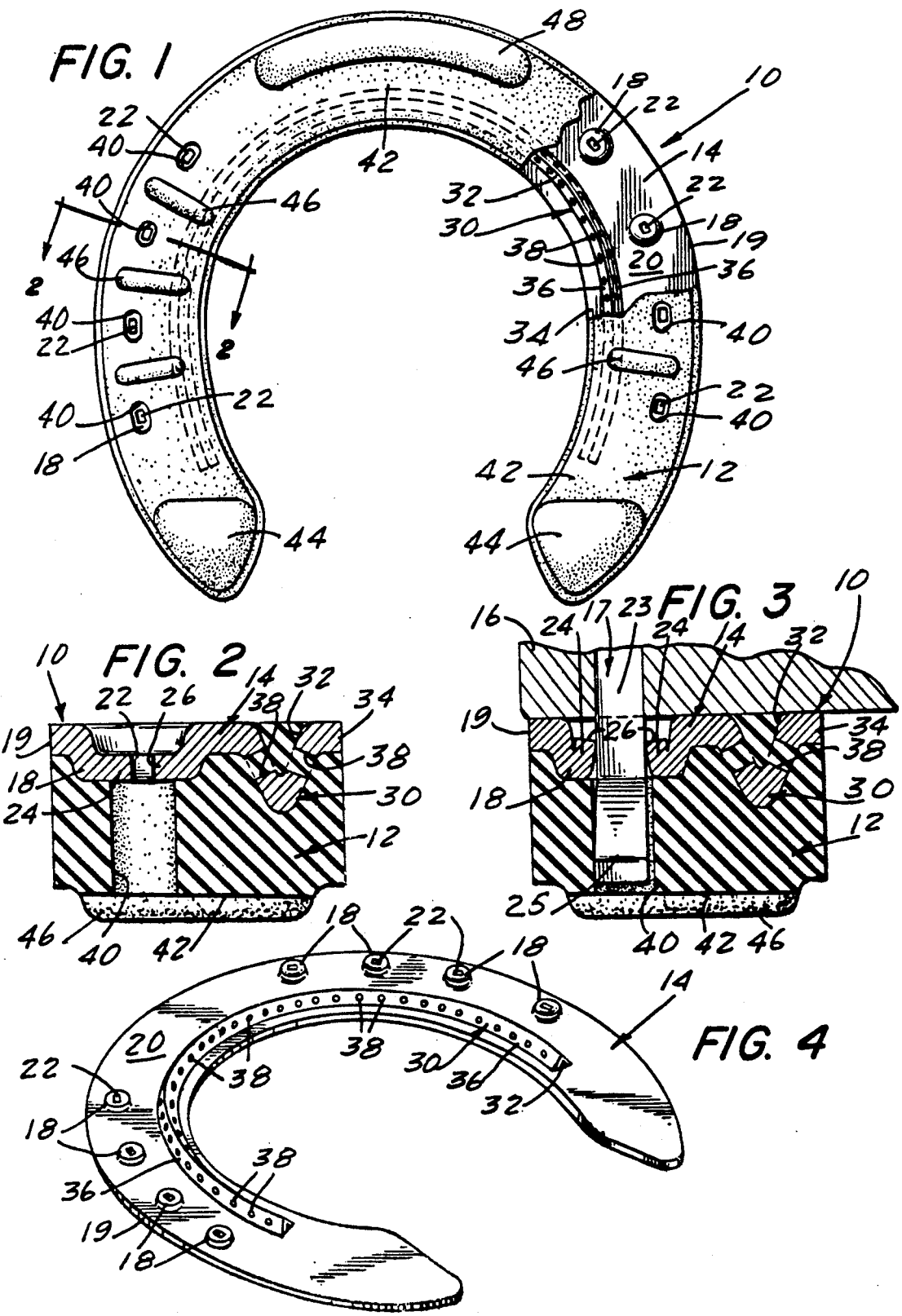

CUSHIONED HORSESHOE

BACKGROUND OF THE INVENTION

1. Field of the Invention

The present invention relates generally to the field of horseshoes and more particularly to a non-slip, shock-absorbing, cushioned horseshoe which substantially absorbs the shock placed on the horse's hoofs and legs when the horse is taking part in various activities such as running or jumping. The cushioned horseshoe includes a mounting plate to which a non-slip, resilient sole or body member is affixed for direct engagement with the ground surface.

2. Description of the Prior Art

As is well known in the art various problems and difficulties are encountered in providing suitable means incorporated in a horseshoe so as to prevent the transmission of shock to the horse's hoofs and legs as the horse is jumping, racing, etc.

Horses are shod not only to protect hoofs but also as a safety measure to prevent slipping. However, when a horse is shod with conventional metal horseshoes, the shock created when the horse's hoofs strike the ground is increased substantially and is transmitted to the legs. This increased shock will cause soreness in the horse's legs and will frequently cause the horse to alter his stride pattern. In many cases this change in stride pattern becomes the cause of strained ankles, knees, tendon, etc. Metal shoes also increase the chance of slipping on surfaces such as cement. However, none of the known attempts to overcome the above problems have been found to be completely satisfactory.

There have been many types of horseshoes designed, tried and suggested in order to provide a horseshoe which will cushion the force at the time of impact of the horse's hoofs while running on different types of ground surfaces. However, these horseshoes have various limitations that restrict their use and they are generally unsuitable for most ground conditions. Moreover, some types are complicated in structure and expensive to manufacture and maintain. As examples of known horseshoes one may refer to any of the following patents.

In U.S. Pat. No. 508,607 issued to W. C. Edge, there is disclosed a horseshoe comprising a fastening plate that is arranged to be secured to a hoof by nails. The fastening plate is formed having depending lug members along the outer and inner edges thereof. A wearing plate or main section of hard material of the shoe has beveled kerfs or notches that are arranged to receive the lug members of the fastening plate, whereby the wearing plate is secured to the fastening plate. A packing of a flexible material is interposed between the fastening plate and the wearing plate.

U.S. Pat. No. 3,494,422 issued to Clark discloses a plastic horseshoe formed from a synthetic resin material. Although this provides some resiliency, the amount of shock absorption is minimal and the wear capability is inferior to that of metallic shoes.

U.S. Pat. No. 971,138, issued to McCormick, discloses a horseshoe having a body portion adapted to be nailed to the horse's hoof. The body portion is provided with a plurality of screw-threaded holes. A metal wear plate, which is adapted to be secured to the underside of the body portion, has countersunk openings which coincide with the screw-threaded holes located in the body portion. The wear plate is secured to the body portion by screws which pass through the countersunk openings and through a layer of resilient material disposed between the body portion and the plate, and up into the threaded-holes. The resilient layer provides almost no shock capabilities, however, since the screws are rigidly secured to the body portion and the heads of the screws contact the running surface. There is, therefore, very little mechanical insulation between the surface and the horse's hooves.

A cushioned horseshoe is also disclosed in U.S. Pat. No. 815,399 issued to Anderson. This shoe includes a body which is shaped to fit a hoof and a resilient pad similar in shape to the body. A wear plate has the same shape in outline as the body and the pad. The horseshoe is mounted on the horse's hoof by driving nails through openings located in the plate, and through the pad, and then the openings provided in the body of the horseshoe.

The Anderson shoe exhibits minimal shock-absorbing capabilities since the nails, just like the screws in the McCormick shoe, transmit shock directly from the running surface to the horse's hooves. It is possible that the nails in the Anderson shoe will be driven up into the hoof thereby seriously injuring the horse. Also, the constant flexing of pad C will tend to loosen the nails so that the shoe will eventually work loose to the point that it is thrown, with possible injury resulting both to the horse and persons in the area.

U.S. Pat. Nos. 830,133; 1,042,943 and 2,024,265 also disclose shoes which are designed to cushion a horse's hooves. These shoes, however, exhibit one or more of the limitations set forth above regarding other prior-art shoes. A shoe which provides substantial shock-absorbing capabilities yet can be securely fixed to the horse's hoof without injury would be highly desirable. Such a shoe would be preferably light in weight, durable, of simple manufacture, and easily installed using conventional tools.

SUMMARY AND OBJECTS OF THE INVENTION

The present invention defines a non-slip, shock-absorbing, cushioned horseshoe that is adapted to be mounted to the hooves of a horse and more particularly suited for use on race horses and the like. The cushioned horseshoe has a generally U-shaped configuration which comprises a base or mounting plate which includes a plurality of spaced-apart boss members having nail holes formed therein that are so arranged to lockingly receive nails therethrough. The base plate includes a V-shape channel having a plurality of holes disposed in the walls thereof so as to provide a means by which a resilient sole or body member can be fixedly secured to the underside of the base plate. The sole member is formed with a plurality of nail openings that are aligned with the locking nail holes in the base or mounting plate. The nail openings in the resilient base member and the mounting plate coincide so that the nails may be inserted into the holes and driven into the horse's hoof until the head of the nail contacts the locking boss of the mounting plate. The ground-engaging surface of the base member is also provided with several protruding wear members to aid in preventing the shoes from slipping.

Accordingly, the present invention has an important object to provide a cushioned horseshoe having shock-absorbing capabilities, including a means for fixedly securing the shoe to the horse's hoof without causing injury to the horse.

It is another object of the invention to provide a cushioned horseshoe that comprises only two parts, a first part that defines a base or mounting plate which is adapted with a plurality of boss members, and a second part that defines a ground-engaging sole or body member consisting of a resilient material that is fixedly secured to the mounting plate by means of molding the sole member to the base member whereby the sole member prevents the transfer of shock to the horse's hoof.

Another object of the invention is to provide a cushioned horseshoe wherein the resilient material becomes secured to the lower surface of the mounting plate during the molding process. Not only does the resilient material become affixed to the lower surface, but it is also fixedly molded in a channel member by means of a plurality of holes disposed in the side walls of the channel member.

Still another object of the present invention is to provide a horseshoe of this character that can also withstand large lateral forces in addition to providing a shock absorbing shoe. This is primarily due to the fact that the boss members and the channel member are arranged to extend into the resilient sole member which effectively prevents the two members of the shoe from shifting laterally with respect to each other. Hence, this permits the shoe to withstand large shear forces and establishes adequate lateral support, even under racing conditions.

It is well known that under hard use, such as racing, metal shoes will heat due to the abrasion and friction with the ground. The heated shoes will tend to drive the natural lubricant out of the hoof. Thus, this is prevented due to the arrangement of the present device in that the resilient sole of the shoe effectively insulates the hoof from the ground surfaces.

A further object of the present invention is to provide a device of this character that is relatively inexpensive to manufacture, and is simple yet rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, materials, arrangements or modes of operation that are properly within the scope of the appended claims.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts, in which:

FIG. 1 is a bottom plan view of a cushioned horseshoe defining the present invention, wherein a portion thereof is broken away to show the channel member and the holes therein which help to secure the sole to the mounting plate, and the location of the boss members that lockingly secure the nails once they have been driven into the hoof of the horse;

FIG. 2 is an enlarged cross-sectional view thereof taken substantially along line 2—2 of FIG. 1;

FIG. 3 is an enlarged cross-sectional view similar to FIG. 2, which further shows a nail locked in the boss member of the base plate and the head of the nail located in the opening formed in the resilient sole member thereof; and FIG. 4 is a perspective view of the mounting plate of the horseshoe illustrating the lower surface that engages the sole member.

DESCRIPTION OF THE PREFERRED EMBODIMENT

Referring more particularly to the drawings, there is shown in FIG. 1 a non-slip, shock-absorbing, cushioned horseshoe, generally indicated at 10. This is a bottom plan view thereof, wherein a resilient sole or body member 12 is substantially illustrated as having a U-shaped configuration. A portion of sole member 12 is broken away so as to show a base or mounting plate member 14. Mounting plate 14 is more readily illustrated in the perspective view of FIG. 4, and is referred to as a base or mounting plate, since it provides both functions as will be hereinafter described.

Accordingly, plate 14 is formed from a suitable metal having a U-shaped configuration that is adapted to be secured against a horse's hoof 16. Plate 14 defines a base member for the shoe itself (FIG. 3). However, plate 14 further defines a mounting member so as to provide the necessary means by which the resilient sole member 12 is firmly mounted and secured in place on hoof 16 by nails 17. Thus, to simplify the following description, plate 14 will be referred to as mounting plate 14. As illustrated in FIG. 4, mounting plate 14 is formed having a plurality of spaced-apart boss members 18 that help define a fastening means for cushioned horseshoe 10. Boss members 18 are shown located adjacent the outer edge 19 of mounting plate 14, and are arranged in two groups of fours. However, it should be understood that boss members 18 can be formed and positioned in any suitable manner so as to sufficiently protrude downwardly from the lower surface 20 thereof, which is the engaging surface between mounting plate 14 and sole 12. That is, boss members 18 may be juxtapositioned about the surface area, depending on the size and need of the shoe. Each boss 18 member includes a locking hole 22 that is large enough to receive the body portion 23 of nail 17, but not the enlarged head 25 thereof. Preferably, locking hole 22 is formed having a substantially rectangular configuration, and oppositely disposed lip members 24 are defined along the longitudinal edges 26 of hole 22. These lip members establish a means for locking a typical squared hoof nail 17. A more detailed description relating to the locking means will follow hereinafter.

Plate 14 is also formed having means to firmly secure resilient sole member 12 to its surface 20. This means is designated at 30 and is shown as a horseshoe-shaped channel 32 that is formed in a V-shape configuration which extends downwardly in the same direction as boss members 18 in plate 14. Channel 32 is positioned adjacent the inner edge 34 of plate 14, as illustrated in both FIGS. 1 and 4, and more particularly in the cross-sectional views of FIGS. 2 and 3. Channel 32 is defined by integrally formed converging side walls 36, both of said walls being provided with a plurality of securing holes 38 that are spaced apart along the full length of each wall 36. In FIGS. 2 and 3 securing holes 38 are shown as directly opposite each other. However, they can be positioned in a random or staggered arrangement as long as the material of sole 12 is allowed to be received through holes 38 and into channel 32. It is also to be noted that other suitable shapes for channel 32 may be employed.

Referring more particularly to resilient sole member 12, the sole member is shown fixedly mounted to lower surface 20 of mounting plate 14. Sole member 12 is formed having a plurality of nail holes or openings 40 that are vertically aligned with respective locking holes 22 so as to receive nail 17 therethrough as the nail is driven into hoof 16 of a horse (FIG. 3). Openings 40 are large enough to receive the enlarged head portion 25 of nail 17 so as to be positioned therein when nail head 25 is prevented from passing through locking holes 22.

In FIG. 1, the ground-engaging wear surface 42 of sole member 12 is illustrated as having a plurality of protruding wear pads. The distal ends of the U-shaped sole are formed having enlarged toe-like wear pads 44, with transverse elongated wear pads 46 interposed between nail holes 40. Still another wear pad 48 is positioned at the leading arch of sole member 12. Thus, wear pads 44, 46 and 48 define a means for preventing shoe 10 from slipping under various adverse ground conditions while the horse is running or jumping.

The preferred method of securing or mounting sole member 12 to plate 14 is by molding a resilient material, such as neoprene or the like, to mounting plate 14 and allowing the material to fill the V-shaped channel 32 through securing holes 38. This arrangement defines the additional securing means that prevents sole member 12 from pulling apart from mounting plate 14. It should be noted that an adhesive is often coated on the under-surface of the metal plate to establish a stronger bond between plate 14 and sole 12 of the cushioned horseshoe. With such a strong bonding between metal plate 14 and sole member 12, the resilient sole is free to expand laterally in all directions including the area under each boss, thereby enhancing the cushioning effect of the sole or base member 12. Thus, shoe 10 is also capable of withstanding large lateral forces in addition to providing substantial cushioning. This effect is primarily due to the location of the depending bosses and the downwardly protruding channel. Both bosses 18 and channel 32 are recessed and captured within the resilient material of the sole member. This arrangement effectively prevents the separation of the resilient material from the mounting surface of plate 14 by preventing lateral shifting of sole 12. Accordingly, this feature permits shoe 10 to withstand large shear forces and provides adequate lateral support for each of the horse's legs, even under unsuitable ground conditions.

What I claim is:

1. A cushioned horshoe comprising:
   a mounting plate having an upper hoof-engaging surface and a lower mounting surface;
   a plurality of depending boss members formed in said mounting plate;
   locking means formed in said boss members whereby a nail may be driven through each of said boss members, and whereby each nail is locked therein to prevent the nail from being inadvertently loosened after the nail has been driven into the hoof of a horse;
   a sole member formed from a resilient material and secured to said lower mounting surface of said mounting plate, said sole member having a plurality of openings formed therein and substantially aligned with said locking means in said mounting plate; and
   means for securing said sole member to said mounting plate, said securing means comprising a depending channel formed adjacent one edge of said mounting plate, and said channel including a plurality of securing holes formed therein, whereby said resilient material is affixed to said lower mounting surface and disposed within said channel and said securing holes thereof; and wherein said channel is formed having a V-shaped configuration defined by converging wall members wherein said securing holes are located along each of said wall members thereof.

2. A cushioned horseshoe as recited in claim 1, wherein said locking means comprises a hole formed in each of said boss members, wherein each said hole is defined by a pair of lip members that lockingly engage the walls of the nail.

3. A cushioned horseshoe as recited in claim 2, wherein each said hole in said boss members is sufficiently small to prevent the head of the nail from passing therethrough, and wherein the head of the nail is positioned within said openings formed in said sole member.

4. A cushioned horseshoe as recited in claim 3, wherein each said boss members are spaced apart from each other and positioned along one of the edges of said mounting plate.

5. A cushioned horseshoe as recited in claim 4, wherein said boss members and said channel are located adjacent opposite edges of said mounting plate, wherein there is defined a means for preventing lateral movement of said sole member.

6. A cushioned horseshoe as recited in claim 1, wherein said sole member includes a plurality of wear members.

* * * * *